(12) United States Patent
Jiang

(10) Patent No.: US 9,488,881 B2
(45) Date of Patent: Nov. 8, 2016

(54) ARRAY SUBSTRATE AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventor: Wenbo Jiang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

(*) Notice: Subject to any disclaimer, the term of this patent is extended or adjusted under 35 U.S.C. 154(b) by 279 days.

(21) Appl. No.: 14/351,007

(22) PCT Filed: Dec. 27, 2013

(86) PCT No.: PCT/CN2013/090715
§ 371 (c)(1),
(2) Date: Apr. 10, 2014

(87) PCT Pub. No.: WO2014/206052
PCT Pub. Date: Dec. 31, 2014

(65) Prior Publication Data
US 2016/0070143 A1 Mar. 10, 2016

(30) Foreign Application Priority Data
Jun. 28, 2013 (CN) .......................... 2013 1 0269772

(51) Int. Cl.
*G02F 1/1343* (2006.01)
*G02F 1/1333* (2006.01)

(52) U.S. Cl.
CPC ..... *G02F 1/134336* (2013.01); *G02F 1/13439* (2013.01); *G02F 1/133345* (2013.01); *G02F 1/134309* (2013.01); *G02F 1/134363* (2013.01); *G02F 2001/134318* (2013.01); *G02F 2201/121* (2013.01)

(58) Field of Classification Search
CPC ....... G02F 2001/134372; G02F 2001/134318; G02F 1/134363
See application file for complete search history.

(56) References Cited

U.S. PATENT DOCUMENTS

2004/0066481 A1 4/2004 Hong et al.
2007/0159566 A1 7/2007 Kang
(Continued)

FOREIGN PATENT DOCUMENTS

CN 1487346 A 4/2004
CN 102033365 A 4/2011
(Continued)

OTHER PUBLICATIONS

International Search Report for International Application No. PCT/CN2013/090715 issued Mar. 19, 2014, 14 pgs.
(Continued)

*Primary Examiner* — Richard Kim
*Assistant Examiner* — Kendrick Hsu
(74) *Attorney, Agent, or Firm* — Ladas & Parry LLP

(57) ABSTRACT

An array substrate and a display device are provided. The array substrate comprises: an substrate (1); a common electrode line (12); and a plurality of pixel units arranged in an array, each of the pixel units includes a first common electrode (7), a pixel electrode (4) and a second common electrode (8) provided and successively arranged on the substrate (1); an insulating protective layer (9) is provided between both of the pixel electrode (4) and the first common electrode (7), and between the pixel electrode (4) and the second common electrode (8); projections of the pixel electrode (4) and of the first common electrode (7) on the substrate (1) are overlapped, and projections of the pixel electrode (4) and of the second common electrode (8) on the substrate (1) are overlapped, so as to mitigate the problem of screen flicker occurred during the use of display device and decrease the delay occurred during the transmission of the common voltage signal to avoid any failure due to crosstalk, thereby improving the effect of display of the display device.

20 Claims, 3 Drawing Sheets

(56) References Cited

U.S. PATENT DOCUMENTS

2011/0085121 A1 4/2011 Jeon et al.
2013/0112983 A1 5/2013 Kao et al.

FOREIGN PATENT DOCUMENTS

| CN | 103094069 A | 5/2013 |
|---|---|---|
| CN | 103353695 A | 10/2013 |
| CN | 203311140 U | 11/2013 |
| JP | 200864954 A * 3/2008 | .......... G02F 1/1343 |

OTHER PUBLICATIONS

First Chinese Office Action dated Apr. 3, 2015; Appln. No. 201310269772.0.
International Preliminary Report on Patentability Appln. No. PCT/CN2013/090715; Dated Dec. 29, 2015.

* cited by examiner

ARRAY SUBSTRATE AND DISPLAY DEVICE

CROSS REFERENCE TO RELATED APPLICATIONS

This application is based on International Application No. PCT/CN2013/090715 filed on Dec. 27, 2013, which claims priority to Chinese National Application No. 201310269772.0 filed on Jun. 28, 2013. The entire contents of each and every foregoing application are incorporated herein by reference.

BACKGROUND

Embodiments of the present invention relate to an array substrate and a display device.

SUMMARY

Array substrates based on the advanced super dimension switch (ADS) technology has been widely used in LCD technical field for its advantages, such as wide viewing angle. The ADS technology can improve the work efficiency of the liquid crystal (LC) while increase the transmission efficiency mainly by creating a multi-dimensional electrical field consisted of an electric field generated by edges of slit electrodes in one plane and an electric field generated between a slit electrode layer and a plate electrode layer, to rotate all the oriented LC molecules located between the slit electrodes and direct above the electrodes in the LC cell. The ADS technology can improve the image quality of TFT-LCD products, and have advantages of high resolution, high transmissivity, low power consumption, broad viewing angle, high aperture ratio and low color distortion, no push Mura.

FIG. 1 through FIG. 3 show one of implementations of a conventional ADS product, in which the array substrate comprises a plurality of pixel units, each of the pixel units comprises a gate insulating layer 2 uniformly deposited on a substrate 1, a pixel electrode 4 connected to an source electrode 3 disposed above the gate insulating layer 2, a passivation layer 5 uniformly deposited above the pixel electrode 4, and a common electrode 6 electrically connected to a common electrode line disposed above the passivation layer 5, wherein the common electrode 6 is a slit electrode. In power-up state, the pixel electrode 4 and the common electrode 6 form a multi-dimensional electric field to drive the LC for displaying; at the same time, the pixel electrode 4 and the common electrode 6 are overlapped in a portion which forms a storage capacitance for maintaining an electrical voltage on the pixel electrode 4.

However, in the array substrate of the above-mentioned ADS-based products, the common electrode lines in the pixel unit has a relatively large resistance, which causes failure due to crosstalk resulted by a delay in the transmission of the common voltage signal, and hence influences the display effect of the display device. In addition, since the ADS-based array substrate is increasingly improved in its resolution while it requires slit electrode to serve as the common electrode 6 in each pixel unit, the storage capacitance in each pixel unit becomes extremely small, which causes frequently occurred screen flicker during the use of display device, and hence influences the display effect of the display device.

SUMMARY

The embodiments of the present invention provide an array substrate to mitigate the problem of screen flicker occurred during use of display device, while decreasing delay occurred during the transmission of common voltage signal to avoid any failure due to crosstalk. Moreover, the embodiments of the present invention further provide a display having the array substrate.

An array substrate comprising an substrate; common electrode line; and a plurality of pixel units arranged in an array, wherein each of said pixel units includes a first common electrode, a pixel electrode and a second common electrode provided and successively arranged on said substrate; an insulating protective layer is provided between both of said pixel electrode and said first common electrode, and said pixel electrode and said second common electrode; projections of said pixel electrode and of said first common electrode on said substrate are overlapped, and projections of said pixel electrode and of said second common electrode on said substrate are overlapped.

In an example, the pixel electrode is a plate electrode, and the second common electrode is a slit electrode.

In an example, the first common electrode and the second common electrode both are electrically connected to the common electrode line.

In an example, the first common electrode is a plate electrode.

In an example, the first common electrodes in adjacent columns of the pixel units are electrically connected through a stripe electrode; or, the first common electrodes in adjacent columns of the pixel units are electrically connected through a bridge wire.

In an example, the first common electrodes in adjacent rows of the pixel units are electrically connected through a stripe electrode; or, the first common electrodes in adjacent rows of the pixel units are electrically connected through a bridge wire.

In an example, the second common electrode and the first common electrode are electrically connected through a via hole, and the first common electrode is electrically collected to the common electrode line through the second common electrode.

In an example, the first common electrode and the second common electrode in each of the pixel units are electrically connected through a via hole.

In an example, the first common electrode and the second common electrode in every at least two columns of the pixel units are electrically connected through a via hole.

In an example, each of the first common electrode, second common electrode and pixel electrode is an ITO (indium tin oxide) electrode.

In an example, the first common electrode is directly contacted with the substrate.

The embodiments of the present invention also provide a display device comprising any one of array substrate described in the above technical solutions.

BRIEF DESCRIPTION OF THE DRAWINGS

Embodiments of the present invention will be described in more detail below with reference to the accompanying drawings to enable those skilled in the art to understand the present invention more clearly, wherein.

Figure 1:
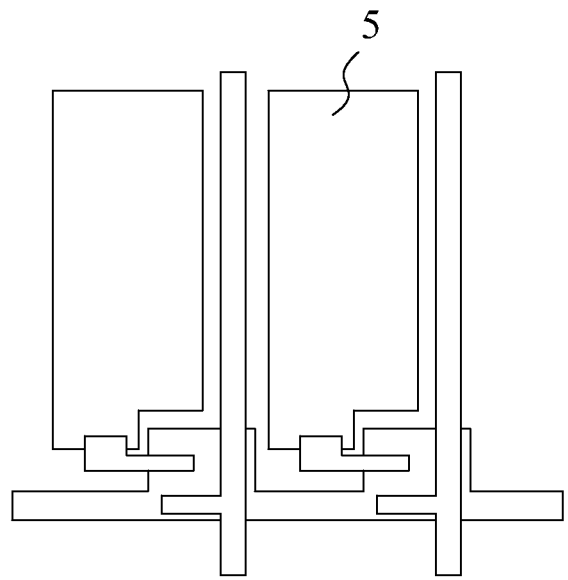
FIG. 1 is a schematic plan view of a pixel unit without common electrode in the ADS-based array substrate according to conventional technology.
Figure 2:
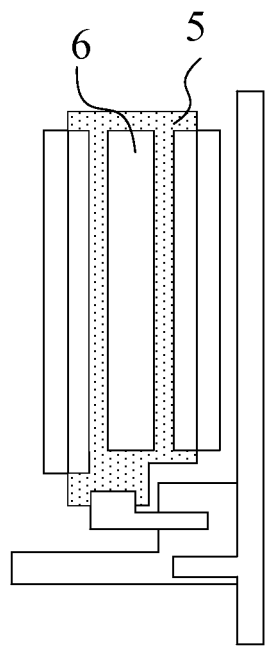
FIG. 2 is a schematic plan view of a pixel unit arranged with common electrode in the ADS-based array substrate according to conventional technology.
Figure 3:
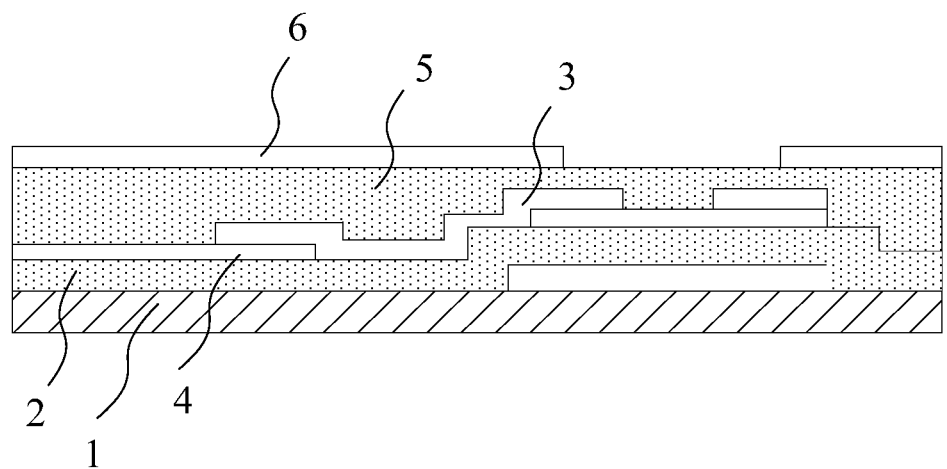
FIG. 3 is a structural side view of a displaying area of a pixel unit in the ADS-based array substrate according to conventional technology.

Wherein, numeral references in the drawings are:

1. substrate; 2. gate insulating layer; 3. source electrode; 4. pixel electrode; 5. passivation layer; 6. common electrode; 7. first common electrode; 8. second common electrode; 9. insulating protective layer; 10. via hole; 11. stripe electrode; 12. common electrode line.

DETAILED DESCRIPTION OF THE PREFERRED EMBODIMENTS

In order to make objects, technical details and advantages of the embodiments of the invention apparent, technical solutions according to the embodiments of the present invention will be described clearly and completely as below in conjunction with the accompanying drawings of embodiments of the present invention. It is to be understood that the described embodiments are only a part of but not all of exemplary embodiments of the present invention. Based on the described embodiments of the present invention, various other embodiments can be obtained by those of ordinary skill in the art without creative labor and those embodiments shall fall into the protection scope of the present invention.

Unless otherwise defined, all the technical and scientific terms used herein have the same meanings as commonly understood by one of ordinary skill in the art to which the present invention belongs. The terms, such as "first," "second," or the like, which are used in the description and the claims of the present application, are not intended to indicate any sequence, amount or importance, but for distinguishing various components. Also, the terms, such as "a/an," "one," or the like, are not intended to limit the amount, but for indicating the existence of at lease one. The terms, such as "comprise/comprising," "include/including," or the like are intended to specify that the elements or the objects stated before these terms encompass the elements or the objects and equivalents thereof listed after these terms, but not preclude other elements or objects. The terms, "on," "under," or the like are only used to indicate relative position relationship, and when the position of the object which is described is changed, the relative position relationship may be changed accordingly.

Figure 4:
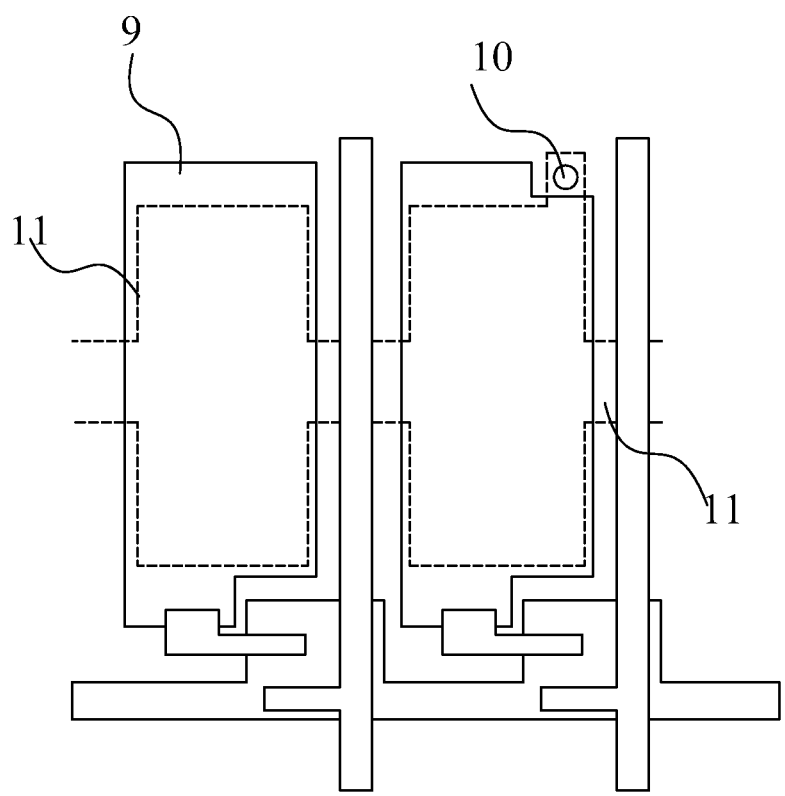
FIG. 4 is a schematic plan view of a pixel unit without the second common electrode in the array substrate provided by an embodiment of the present invention.
Figure 5:
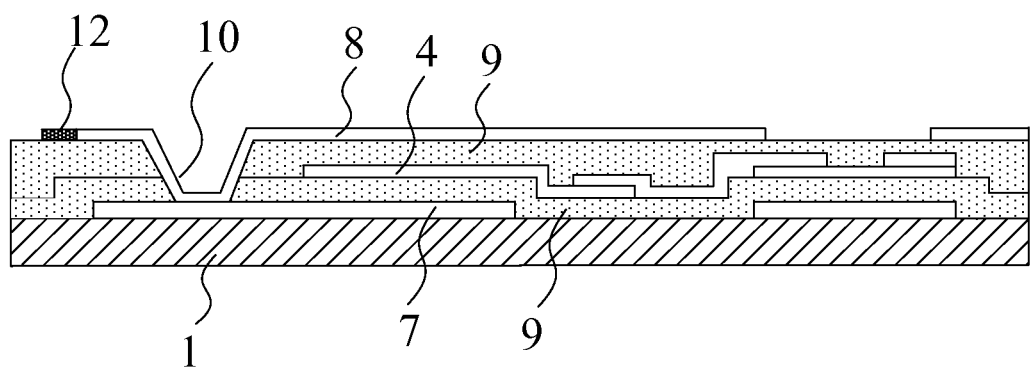
FIG. 5 is a structural side view of a displaying area of a pixel unit in the array substrate provided by an embodiment of the present invention.

Refer to FIG. 4 and FIG. 5, the embodiments of the present invention provide an array substrate comprising a common electrode line 12 and a plurality of pixel units arranged in an array. Each of the pixel units comprises a first common electrode 7, a pixel electrode 4 and a second common electrode 8 which are disposed and successively arranged on an substrate 1. The pixel electrode 4 is a plate electrode, and the second common electrode 8 is a slit electrode. Insulating protective layers 9 are disposed between the pixel electrode 4 and the second common electrode 8, and between the pixel electrode 4 and the first common electrode 7. Projections of the pixel electrode 4 and of the first common electrode 7 on the substrate 1 are overlapped, and projections of the pixel electrode 4 and of the second common electrode 8 on the substrate 1 are overlapped. The first common electrode 7 and the second common electrode 8 are both electrically connected to the common electrode line 12. In the present embodiment, it only requires electrical connection between the common electrode line 12 and the common electrodes, without the need of considering the connection between the common electrode line and other electrode lines; therefore there is no limitation to the wiring arrangement of the common electrode line 12 herein.

During operation of the array substrate in the embodiments of the present invention, in each pixel unit, the pixel electrode 4 can form a storage capacitance with the first common electrode 7, and also can form a storage capacitance with the second common electrode 8, which can increase the storage capacitance in each pixel unit, thereby mitigating the problem of screen flicker occurred during the use of display device. At the same time, since the first common electrode 7 and the second common electrode 8 are both electrically connected to the common electrode line 12, they both form a parallel resistor with the common electrode line 12, so as to effectively decrease the resistance in each pixel unit, thereby reducing the delay occurred during the transmission of the common voltage signal on the common electrode line 12.

The embodiments of the present invention therefore effectively mitigate the problem of screen flicker occurred during the use of display device while decreasing the delay occurred during the transmission of common voltage signal, so as to avoid any failure due to crosstalk and improve the display effect of the display device.

The first common electrode 7 may be selected from a plate electrode, a slit electrode or electrodes in other structures or shapes, depending on demands of display. In one example, the first common electrode 7 adopts a plate substrate to facilitate adjusting the overlapped area between the projections of the first common electrode 7 and of the pixel electrode 4 on the substrate 1 during the manufacture of the array substrate.

In order to further decrease the resistance resulted from parallel connection between the first common electrode 7 and the common electrode line 12, it's possible to electrically connect the first common electrodes 7 in any two adjacent columns of the pixel units, to allow a plurality of first common electrodes 7 in a same row form a series resistor, which, in turn, forms an even smaller resistor with the common electrode line 12, thereby further facilitating the decrease of the delay occurred during the transmission of common voltage signal on the common electrode line 12. In addition, such structure is also advantageous in improving the uniformity of the common voltage in the entire display device.

As shown in FIG. 4, it's also possible to electrically connect the first common electrodes 7 in adjacent columns of the pixel units through a stripe electrode 11; or, electrically connect the first common electrodes 7 in adjacent columns of the pixel units through a bridge wire.

In addition, it's also possible to electrically connect the first common electrodes 7 in adjacent rows of the pixel units, to allow a plurality of first common electrodes 7 in a same column form a series resistor, thereby reducing the parallel resistance and further decreasing the delay occurred during the transmission of the common voltage signal on the common electrode line 12.

It's also possible to electrically connect the first common electrodes 7 in adjacent rows of the pixel units through a stripe electrode 11; or, electrically connect the first common electrodes 7 in adjacent rows of the pixel units through a bridge wire.

It's also possible to electrically connect the first common electrodes 7 in the pixel units of both adjacent columns and adjacent rows through a stripe electrode 11, bridge wires or other electrical connectors to form cross-linking connections, so that the parallel resistance formed by the first common electrodes 7 and the common electrode line 12 is decreased.

When the first common electrodes 7 in the described pixel units are electrically connected, it's preferable to perform the connection by using a stripe electrode 11, and the stripe electrode 11 can be made of the same material as that of the first common electrode 7 to form even smaller contact resistance.

As shown in FIG. 4 and FIG. 5, for example, the described second common electrode 8 and first common electrode 7 are electrically connected through a via hole 10, and the first common electrode 7 is electrically connected to the common electrode line 12 through the second common electrode 8.

The second common electrode 8 and the first common electrode 7 are electrically connected through a via hole 10, so that the first common electrode 7 can be indirectly electrically connected to the common electrode line 12 without further providing an electrical connector between the first common electrode 7 and the common electrode line 12, which decreases the number of the electrical connectors used in the pixel unit.

For example, the first common electrode 7 and the second common electrode 8 in each pixel unit can be electrically connected through a via hole, so that each first common electrode 7 can be indirectly electrically connected to the common electrode line 12 through the second common electrode 8, thereby further stabilizing the electrical connection between the first common electrode 7 and the common electrode line 12. Alternatively, the first common electrode 7 and the second common electrode 8 in the pixel units of at least every other columns are electrically connected through a via hole. In such a way, under the circumstance that the first common electrodes in two pixel units of adjacent columns are electrically connected, it's possible to firstly connect the first common electrode 7 and the second common electrode 8 in one pixel unit through a via hole 10, and then electrically connect the first common electrode 7 and the second common electrode 8 in another pixel unit spaced from the one pixel unit by one column, two columns, three columns or four columns, through a via hole 10. Since it's difficult to effectively control the LC above the area of the via holes, a higher aperture ratio can be obtained from the latter connection manner in which the first common electrode 7 and the second common electrode 8 in the pixel units of at least every other column are electrically connected through a via hole 10, as compared with the former connection manner.

For example, in the pixel unit of the array substrate provided in the embodiments of the present invention, each of the first common electrode 7, the second common electrode 8 and the pixel electrode 4 may be an ITO electrode. The stripe electrode 11 may be made of the same material as that of the first common electrode 7, i.e., the stripe electrode 11 may also be an ITO electrode.

As shown in FIG. 5, the first common electrode 7 is directly contacted with the substrate 1; that is, the first common electrode 7 in each pixel unit of the array substrate provided in the embodiments of the present invention can be directly formed on the substrate 1.

For example, the described insulating protective layer 9 may be made of materials, such as silicon nitride, silicon oxide, silicon oxynitride or other insulating materials applicable for array substrate known in conventional technology.

Based on the above technical solutions, the embodiments of the present invention further provide a display device comprising any array substrate described by the above technical solutions. The display device may be any product or component having display function, such as LC panel, electronic paper, OLED panel, LC TV, LCD display, digital photo frame, mobile phone and tablet PC.

During operation of the array substrate in the embodiments of the present invention, in each pixel unit, the pixel electrode can form a storage capacitance with the first common electrode, and can also form a storage capacitance with the second common electrode, which can increase the storage capacitance in each pixel unit, thereby mitigating the problem of screen flicker occurred during the use of display device. At the same time, since the first common electrode and the second common electrode are both electrically connected to the common electrode line, they both form a parallel resistor with the common electrode line, so as to effectively decrease the resistance in each pixel unit, thereby reducing the delay occurred during the transmission of the common voltage signal on the common electrode line.

The array substrate provided by the embodiments of the present invention effectively mitigates the problem of screen flicker occurred during the use of the display device and decreases the delay occurred during the transmission of the common voltage signal, so as to avoid any failure due to crosstalk, thereby improving the display effect of the display device.

It is understood that the described above are just exemplary implementations and embodiments to explain the principle of the present invention and the invention is not intended to limit thereto. An ordinary person in the art can make various variations and modifications to the present invention without departure from the spirit and the scope of the present invention, and such variations and modifications shall fall in the scope of the present invention.

What is claimed is:

1. An array substrate, comprising:
   an substrate;
   a common electrode line; and
   a plurality of pixel units arranged in an array, wherein each of said pixel units includes a first common electrode, a pixel electrode and a second common electrode provided and successively arranged on, said substrate; an insulating protective layer is provided between both of said pixel electrode and said first common electrode, and said pixel electrode and said second common electrode; projections of said pixel electrode and of said first common electrode on said substrate are overlapped, and projections of said pixel electrode and of said second common electrode on said substrate are overlapped,
   wherein said first common electrode and said second common electrode are electrically connected through a via hole, and said first common electrode is electrically connected to said common electrode line through said second common electrode.

2. The array substrate according to claim 1, wherein said first common electrode and said second common electrode both are electrically connected to said common electrode line.

3. The array substrate according to claim 1, wherein said pixel electrode is a plate electrode, and said second common electrode is a slit electrode.

4. The array substrate according to claim 1, wherein said first common electrode is a plate electrode.

5. The array substrate according to claim 1, wherein said first common electrodes in adjacent columns of said pixel units are electrically connected through a stripe electrode; or, said first common electrodes in adjacent columns of said pixel units are electrically connected through a bridge wire.

6. The array substrate according to claim 1, wherein said first common electrodes in adjacent rows of said pixel units are electrically connected through a stripe electrode; or, said first common electrodes in adjacent rows of said pixel units are electrically connected through a bridge wire.

7. The array substrate according to claim 1, wherein said first common electrode and said second common electrode in each of said pixel units are electrically connected through a via hole.

8. The array substrate according to claim 1, wherein said first common electrode and said second common electrode in at least every other columns of said pixel units are electrically connected through a via hole.

9. The array substrate according to claim 1, wherein each of said first common electrode, second common electrode and pixel electrode is an ITO electrode.

10. The array substrate according to claim 1, wherein said first common electrode is directly contacted with said substrate.

11. A display device, comprising the array substrate according to claim 1.

12. An array substrate, comprising:

an substrate;

a common electrode line; and a plurality of pixel units arranged in an array, wherein each of said pixel units includes a first common electrode, a pixel electrode and a second common electrode provided and successively arranged on said substrate; and insulating protective layer is provided between both of said pixel electrode and said first common electrode, and said pixel electrode and said second common electrode; projections of said pixel electrode and of said first common electrode on said substrate are overlapped, and projections of said pixel electrode and of said second common electrode on said substrate are overlapped, wherein said first common electrodes in adjacent rows of said pixel units are electrically connected through a stripe electrode; or, said first common electrodes in adjacent rows of said pixel units are electrically connected through a bridge wire;

wherein said first common electrode and said second common electrode are electrically connected through a via hole, and said first common electrode is electrically connected to said common electrode line through said second common electrode.

13. The array substrate according to claim 12, wherein said pixel electrode is a plate electrode, and said second common electrode is a slit electrode.

14. The array substrate according to claim 12, wherein said first common electrode is a plate electrode.

15. The array substrate according to claim 12, wherein said first common electrodes in adjacent columns of said pixel units are electrically connected through a stripe electrode; or, said first common electrodes in adjacent columns of said pixel units are electrically connected through a bridge wire.

16. The array substrate according to claim 12, wherein said first common electrodes in adjacent columns of said pixel units are electrically connected through a stripe electrode; or, said first common electrodes in adjacent columns of said pixel units are electrically connected through a bridge wire.

17. The array substrate according to claim 12, wherein said first common electrodes in adjacent rows of said pixel units are electrically connected through a stripe electrode; or, said first common electrodes in adjacent rows of said pixel units are electrically connected through a bridge wire.

18. The array substrate according to claim 12, wherein said first common electrodes in adjacent rows of said pixel units are electrically connected through a stripe electrode; or, said first common electrodes in adjacent rows of said pixel units are electrically connected through a bridge wire.

19. An array substrate, comprising:

an substrate;

a common electrode line; and a plurality of pixel units arranged in an array, wherein each of said pixel units includes a first common electrode, a pixel electrode and a second common electrode provided and successively arranged on said substrate; an insulating protective layer is provided between both of said pixel electrode and said first common electrode, and said pixel electrode and said second common electrode; projections of said pixel electrode and of said first common electrode on said substrate are overlapped, and projections of said pixel electrode and of said second common electrode on said substrate are overlapped, wherein said first common electrodes in adjacent columns of said pixel units are electrically connected through a stripe electrode; or, said first common electrodes in adjacent columns of said pixel units are electrically connected through a bridge wire;

wherein said first common electrode and said second common electrode are electrically connected through a via hole, and said first common electrode is electrically connected to said common electrode line through said second common electrode.

20. The array substrate according to claim 19, wherein said first common electrode is a plate electrode.

* * * * *